United States Patent [19]
Stoll et al.

[11] Patent Number: 5,711,535
[45] Date of Patent: Jan. 27, 1998

[54] VALVE SPOOL SEAL WITH ONE-PIECE HOUSING RING HAVING AN ARCUATE SIDE WALL AND A STEPPED SIDE WALL

[75] Inventors: Kurt Stoll, Esslingen; Thomas Müller, Filderstadt, both of Germany

[73] Assignee: Festo KG, Esslingen, Germany

[21] Appl. No.: 789,788

[22] Filed: Jan. 29, 1997

[30] Foreign Application Priority Data

Feb. 2, 1996 [DE] Germany ............. 196 03 719.0

[51] Int. Cl.⁶ .................................................. F16J 15/32
[52] U.S. Cl. ...................... 277/182; 277/184; 277/189
[58] Field of Search ........................ 277/50, 152, 167.3, 277/182, 184, 189

[56] References Cited

U.S. PATENT DOCUMENTS

| | | | |
|---|---|---|---|
| 1,941,025 | 12/1933 | Stein | 277/184 |
| 3,250,541 | 5/1966 | McKinven, Jr. | 277/182 |
| 3,442,520 | 5/1969 | Kupchick | 277/184 |
| 5,171,025 | 12/1992 | Stoll et al. | 277/189 |
| 5,513,674 | 5/1996 | Frisch | 277/189 |
| 5,609,343 | 3/1997 | Asou et al. | 277/167.3 |

FOREIGN PATENT DOCUMENTS

| | | |
|---|---|---|
| 0 472 910 B1 | 8/1994 | European Pat. Off. |
| 32 21 526 A1 | 12/1983 | Germany |
| 43 24 529 C1 | 11/1994 | Germany |

Primary Examiner—Scott Cummings
Attorney, Agent, or Firm—Hoffmann & Baron, LLP

[57] ABSTRACT

An annular sealing unit for multiway valves. It comprises an integral housing ring, wherein an elastic sealing element is arranged. The housing ring possesses a cylindrical holding wall for attachment in a recess in the valve housing with a press fit. Furthermore it possesses two side walls projecting radially inward. The one side wall has an arcuate form and the other one is stepped. The stepped design means that there is a satisfactory engagement face for fitting the sealing unit. The arcuate shape of the first side wall prevents any skewing during pressing home during fitting in place. Furthermore a method for the manufacture of the sealing unit is provided, wherein the housing ring is manufactured by forming of the material without machining.

8 Claims, 2 Drawing Sheets

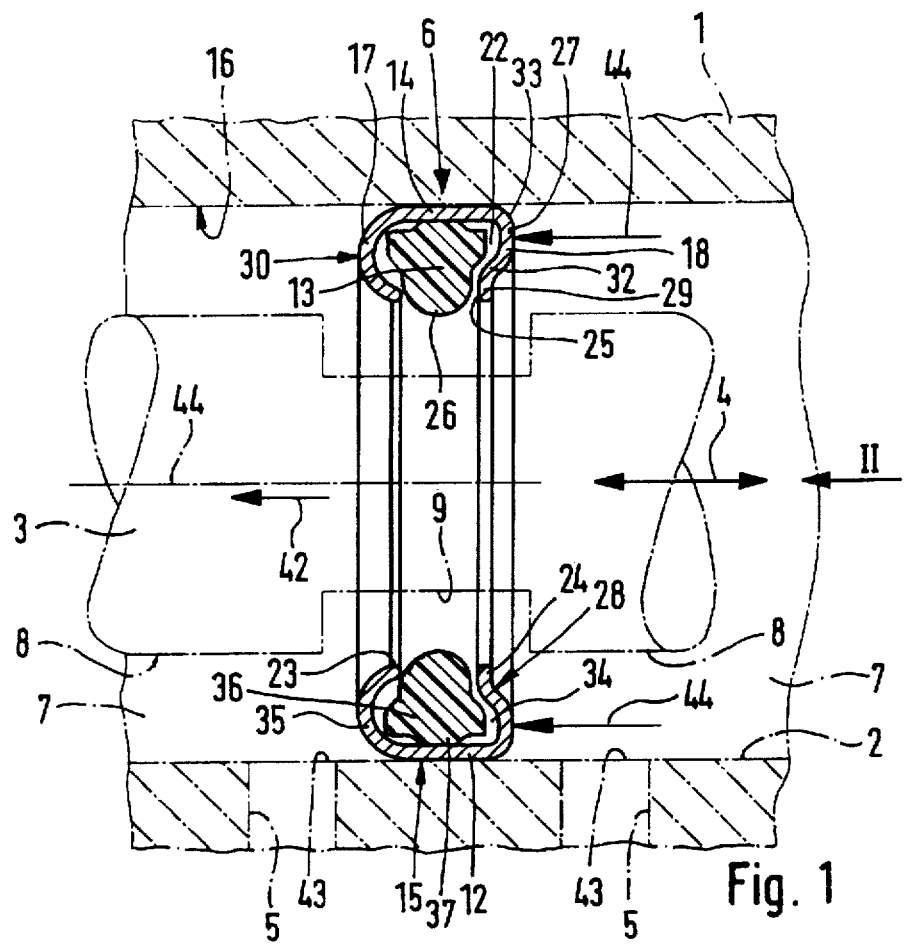
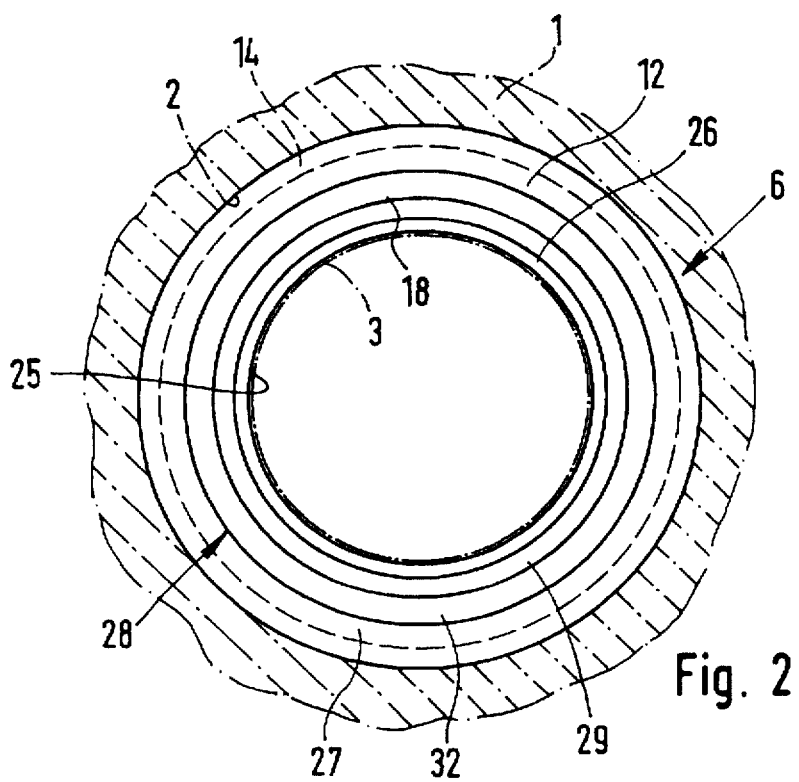

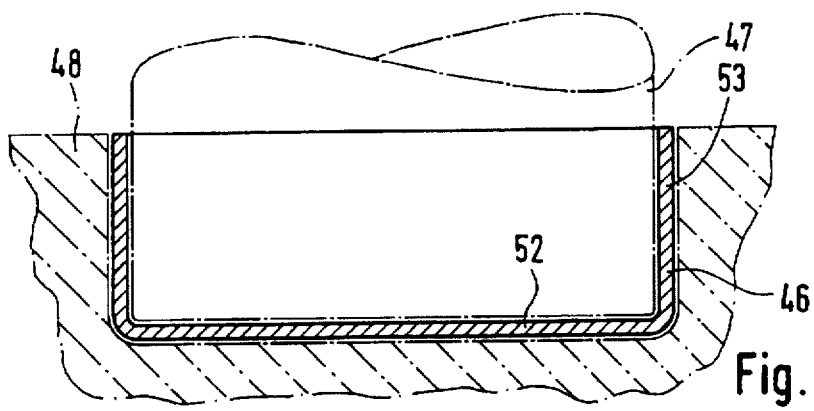
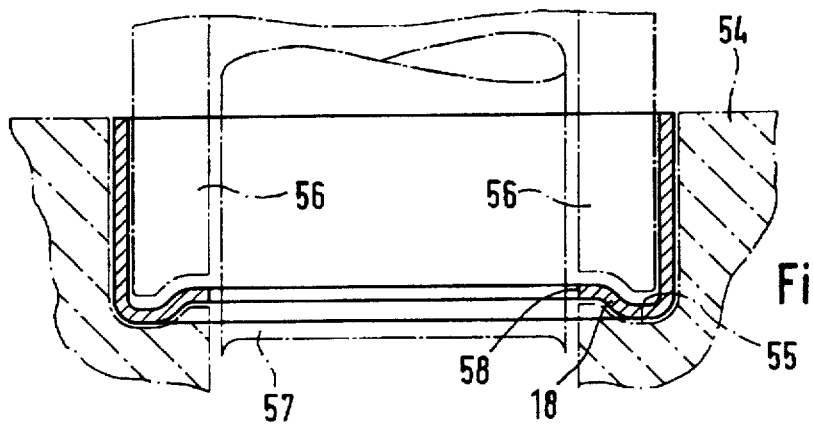
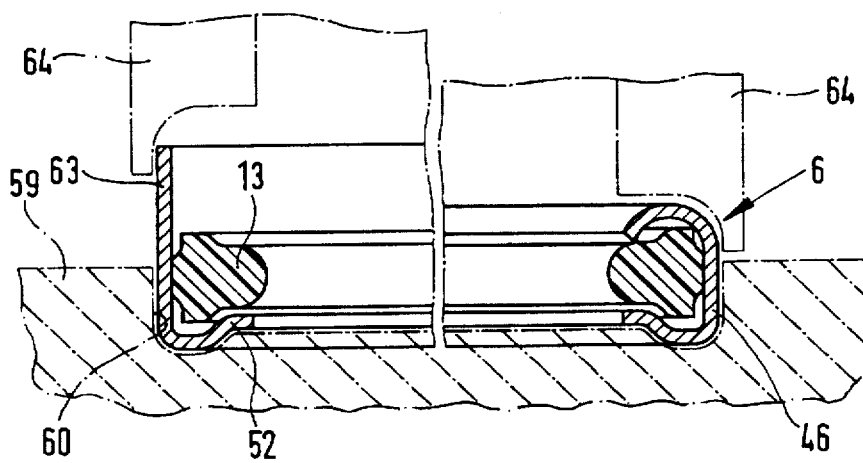

VALVE SPOOL SEAL WITH ONE-PIECE HOUSING RING HAVING AN ARCUATE SIDE WALL AND A STEPPED SIDE WALL

BACKGROUND OF THE INVENTION

The invention relates to an annular sealing unit for use on an axially movable valve spool to produce a sealing action between the spool and the valve housing of a multiway valve, comprising a single-piece housing ring, which comprises a radially externally arranged cylindrical holding wall serving for a press-fit attachment to the housing and two spaced apart annular side walls extending from the housing wall and projecting radially inward, the walls of the housing ring delimiting between them an annular space which opens radially inward at a peripherally extending annular opening, in which space at least one annular, elastically yielding sealing element is anchored, said element having a sealing portion adapted for cooperating with the valve spool and extending radially inward through the annular opening. Furthermore the invention relates to a method for the production of such a sealing unit.

THE PRIOR ART

A sealing unit of this type is disclosed in the European patent publication 0 472 910 B1. It constitutes a component able to be uniformly handled, which in the desired number and with the desired distribution is pressed into the recess in the valve housing receiving the valve spool and surrounds the axially moving valve spool. For the sake of permitting simple production of the sealing unit a multiple-part structure of the housing ring is generally employed. In the case of extremely small overall sizes, in the case of which the outer diameter of the sealing unit amounts to, for instance, only 8 mm, handling of several ring components is however hardly possible so that in this case a single-part design of the housing ring is appropriate. However experience has shown that the cross sectional design described in the said European patent publication 0 472 910 B1 creates problems both as regards forming and also as regards the following operation of pressing the ring into the recess of the valve housing.

SHORT SUMMARY OF THE INVENTION

One object of the invention is consequently to create an annular distributor unit of the type initially mentioned which while being simple to manufacture at the same time may be reliably and rapidly installed in a valve housing.

In order to achieve these and/or other objects appearing from the present specification, claims and drawings, in the present invention in the context of an annular sealing unit of the type initially mentioned the one first side wall of the housing ring has, as seen in cross section, an arcuate form with a curved portion axially bulging out away from the other, second side wall, the second side wall, as seen in section, has a stepped form and possesses a straight outer side wall section being directed essentially radially inward from and adjoining the holding wall, and furthermore an inner side wall section adjoining the first wall section via a step, said inner wall section being offset toward the first side wall and also extending radially inward, the portion, which lies between the outer side section of the second side wall and the arcuate portion, opposite to same, of the first arcuate side wall, of the annular space forming an anchoring portion for the sealing element, the width of this anchoring portion being larger than the width of the annular opening, which to the side is delimited by the inner side section of the second side wall and the terminal portion, opposite to same, of the arcuate first side wall.

It is in this manner that an annular sealing unit is provided, whose housing ring, preferably having a generally U-shaped cross section is an integral component. Accordingly it is more especially possible for small overall sizes of the sealing unit to be simply manufactured and fitted. The pressing into place of the sealing unit in the recess of a valve housing is performed with its first side wall, which possesses a comparatively large radius of its arcuate shape, to the front, the edge-less or smooth transition into and merging with the holding wall offering the advantage that no proud points are present which might lead to jamming in the recess in the valve housing. More particularly, the sealing unit may be readily slipped over and past the opening portions of valve ducts, which peripherally open into the valve housing recess. Since the second side wall, which is opposite to the first side wall, in the region adjoining the holding wall possesses an outer side wall section extending essentially straight in an inward direction, it is possible to readily apply a suitable pressing tool during pressing into place in order to cause the pressing force to act reliably and symmetrically on the housing ring while at the same time avoiding any undesired bending of the second side wall adjacent to the annular opening. Owing to the particular configuration of the two side walls of the housing ring, which preferably throughout has a constant wall thickness, there is simultaneously a configuration of the annular space, which is best suited for anchoring the sealing element and for transversely supporting the sealing projecting part through the annular opening, of the sealing element.

It is convenient for the sealing unit to be produced by causing the bottom wall of a dish-like housing ring blank to assume a configuration corresponding to the stepped second side wall, a central aperture being produced previously, simultaneously or later on by making an aperture in the bottom wall then, following this, starting from the axial side opposite to the formed floor wall a sealing element is introduced into the housing ring blank and then finally terminal section, which projects past the sealing element, of the peripheral wall of the dish-like housing ring blank is formed, for example by embossing or rolling to adopt an arcuate shape conforming to the first side wall.

Further advantageous developments of the invention are defined in the claims.

It has been found to be particularly advantageous to provide a tangential transition between the holding wall and at least the arcuately shaped first side wall of the housing ring. It is in this manner that a gradual surface junction is ensured which even in the case of accidental movement of the sealing unit on the skew in the course of fitting will not lead to any damage to the wall of the valve housing recess.

If the externally directed outer face of the holding wall is designed in the form of a press-fit face not having any sealing element, there is then a reliable sealing action between the housing ring and the valve housing without any additional sealing measures being required.

It is convenient for the housing ring to be a metal part produced by rolling from a housing ring blank, and more particularly by a process of forming involving bending so that it may be termed a molding.

The single-piece or integral design of the housing ring as a molding produced by forming leads to the possibility of having extremely small wall thicknesses for the housing ring so that as seen in the radial direction a comparatively large amount of space is available for receiving the sealing element, which is for instance manufactured as a elastomer component. Accordingly it is possible for a sealing element with comparatively large radial thickness dimensions to be employed, this offering the advantage that the radial deformation capacity is larger, that is required for ensuring a reliable sealing engagement on the valve spool and/or for allowing for inaccuracies in manufacture.

For reasons of compactness it is preferred to provide only one single sealing element in the housing ring.

Further advantageous developments and convenient forms of the invention will be understood from the following detailed descriptive disclosure of one embodiment thereof in conjunction with the accompanying drawings.

LIST OF THE SEVERAL VIEWS OF THE FIGURES

FIG. 1 shows a preferred form of the sealing unit of the invention in cross section along a plane extending axially and radially, a valve housing receiving the sealing unit and a valve spool extending through the sealing unit being only illustrated diagrammatically in chained lines.

FIG. 2 shows the arrangement of FIG. 1 in a axial view looking in the direction as indicated by the arrow II in FIG. 1.

FIGS. 3 through 6 show various different steps in a method for the manufacture of the annular sealing unit, the forming tools only being indicated by the arrows.

DETAILED ACCOUNT OF WORKING EMBODIMENT OF THE INVENTION

In FIGS. 1 and 2, as indicated in chained lines, the reader will see a portion of a valve housing 1, which in a known fashion possesses a recess 2, in the present example a cylindrical one, wherein the valve spool 3, also indicated in chained lines, is arranged for axial motion as indicated by the double arrow 4.

Into the recess 2 in the valve housing 1 there open peripherally a plurality of valve ducts 5 arranged at a distance apart in the axial direction, such valve ducts including as a rule a supply duct, at least one power duct and at least one venting duct.

In the recess 2 in the valve housing 1 a plurality of annular sealing units 6 are preferably arranged, of which in the illustrated working embodiment in FIG. 1 only one is illustrated. The sealing units 5 are arranged at an axial distance apart and divide up the recess 2 into individual recess sections 7 into which respectively one of the valve ducts 5 opens.

The valve spool 3, depicted by way of example, which may also be termed a valve piston or plunger, possesses a cylindrical form which in the axial direction is multiply stepped and is designed completely free of seals. Owing to such stepped shape it possesses length sections 8 with a major diameter and length portions 9 with a minor diameter. In a position comparable to that illustrated in FIG. 1, in the case of which the one length section 9 of minor diameter assumes a position within the annular sealing unit 6, there is a fluid power connection between the recess sections 7 arranged on either side of the sealing unit 6 so that fluid under pressure, more especially compressed air, may flow through. If on the contrary a section of the length with the major diameter 8 is within the sealing unit 6, there is, due to the cooperation between the sealing unit 6 and the valve spool 3 the fluid power connection between the recess sections 7 and, respectively, the valve ducts 5 thereof will be interrupted.

The basic manner of operation of multiway valves being known to those in the art, it is here unnecessary to describe their functional principle in more detail. Detailed descriptions are to be found for example in the said European patent publication 0 472 910 B1 or the European patent publication 0 475 070 B1.

The annular sealing element 6 of the embodiment of the invention is a two-part element, which is composed of a single-piece housing ring 12 and an annular sealing element 13, which is also of single-piece design, held by the housing ring 12. The sealing element 13 consists of a material with rubber-like properties and is preferably an elastomer component. In the case of the housing ring 12 it is preferably a question a metal part with a customized configuration, which is produced for example by bending deformation. It could also be a question of a plastic part.

In cross section the housing ring 12 has an essentially letter U-like shape as indicated in FIG. 1, the opening of the letter U being directed radially inward. It possesses a cylindrical holding wall 14, which is arranged radially on the outside, the cylindrical outer face thereof, which faces radially outward, constituting a press fit face 15, i.e. it is adapted for press-fit engagement.

The annular sealing unit 6 is secured within the recess 2 at the position, where it is to act, by means of a press fit. For this purpose the sealing unit 6, which is slightly radially oversize, is pressed axially into the recess 2 so that the press fit face 15 thereof is firmly thrust against the peripheral face 16 of the recess 2. Further measures for securing the sealing unit 6 in the recess 2 are not required, and in particular it is unnecessary to provide any axially acting support elements. Moreover it is unnecessary to use a sealing element for sealing off the intermediate portion between the peripheral wall 16 of the recess 2 and the press fit face 15, seeing that the press fit serves to ensure a sufficient and reliable fluid-tight connection.

At the two axially directed end portions of the holding wall 14 there is in each case a radially inwardly facing, molded-on projecting annular side wall 17 and 18. These two side walls 17 and 18 delimit, together with the holding wall 14, an annular space 22 in the housing ring 12. Via an annular opening 25, which is delimited by the radially inner end portions 23 and 24 of the side walls 17 and 18, this annular space 22 is open in a radially inward direction toward the valve spool 3.

The sealing element 13 is anchored in the interior of the annular space 22 and has a sealing section 26 thereof, which in the illustrated working embodiment has a generally bead-like cross section, extending right through the annular opening 25 into the part with the axial opening or hole of the sealing unit 6. If a longitudinal section 8, which has the major diameter, of the valve spool 3 within the sealing unit 6, then it will be surrounded by the annular sealing portion 26 with sealing engagement therebetween.

It is preferred for the cross section, as seen in FIG. 1, of the first side wall 17, adjoining the holding wall 14, of the housing ring 12 to be arcuate in shape. The orientation is such that its convex part, i.e. the curved part 30, bulges out axially away from the second side wall 18. Starting at the holding wall 14 and going toward its opposite free end portion 23 the first side wall 17 preferably has a constant curvature. There is a tangential transition to the holding wall 14 so that the holding wall 14 practically adjoins the arcuate first side wall 17 as a tangential extension, at least as far as the outer faces are concerned.

The second side wall 18, which is opposite to and axially spaced from the first side wall 17, has a shape departing from that of the first side wall 17. As considered in cross section it has a stepped form. It possesses an outer side wall section 27 which adjoins the holding wall 14 and extends linearly radially inward, such section 27 being adjoined by a radially inwardly directed inner side wall section 29 (which also preferably extends linearly) at a step 28. The step 28 is so formed that the inner side wall section 29 is offset toward the first side wall 17, that is to say is nearer to it than the outer side wall section 27 which is placed radially further outside.

Adjacent to the step 28 there extends between the outer and the inner side wall section 27 and 29 a connecting section 32, which as considered in cross section is preferably set obliquely and which starting at the outer side wall section possesses a component of its extent directed both radially inward and also axially toward the first side wall 17.

Preferably the outer side wall section 17 is, as considered in cross section, set at a right angle to the holding wall 14. The transitional portion 33 placed therebetween is rounded off, preferably in such a manner that there is a tangential transition both in relation to the holding wall 14 and also in relation to the outer side wall section 27, that is to say the above mentioned components of the housing ring 12 adjoin the curved or bent transitional portion 33 as a tangential extension.

Since the housing ring preferably possesses at least essentially the same wall thickness throughout, the shape is similar both to the inside and to the outside. The result is that adjoining the holding wall 14 the annular space 22 possesses an anchoring portion 34 which is delimited laterally on the one hand by the outer side section 27 of the second side wall 18 and on the other hand by the arcuate section 35 (opposite to the side wall 18) of the first side wall 17. The axially measured width of this anchoring portion 34 is larger than the similarly measured width of the annular opening 25, which is preferably delimited on the one axial side or end by the inner side wall section 29 of the second side wall 18 and on the other side by the oppositely placed end portion 23 of the arcuate first side wall 17.

The constriction of the annular space 22 radially inward is a consequence of the curvature of the first side wall 17 and of the step in the second side wall 18.

The anchoring portion 34 serves for reliably anchoring the sealing element 13 within the annular space 22. Even if owing to seizing of the valve spool 3 after a long period without motion of the valve, the sealing element 13 were to be engaged by a strong inwardly directed tensile force, there would be no possibility of the sealing element 13 being pulled out of the annular space 22. Reliable anchoring is aided by the fact that the only sealing element 13 has an anchoring portion 36 placed in the anchoring portion 34, the width of such portion 36 being larger than the width of the annular opening 25 so that the sealing element 13 is held by a positive fit in the housing ring 12.

The necessary width of the anchoring portion 36 may be produced by using a sealing element 13 of small width, on which laterally on at least one side axial projections are molded, it being a question, for example, on the two axial sides of the sealing element 13 respectively of annularly surrounding projections or separate humps arranged on a circle.

The sealing part 26 of the sealing element 13 adjoining the anchoring part 36 is narrower than the anchoring part 36 so that it fits through the annular opening 25 and extends somewhat further radially inward than the two end portions 23 and 24 of the side walls 17 and 18.

On the inwardly directed outer face of the sealing element 13 a concentrically extension sealing projection 37 is molded, such projection 37 cooperating with the inner face of the holding wall 14 to prevent drive fluid from flowing past the sealing element 13 in the interior of housing ring 12.

In the course of fitting of the sealing unit 6 by pressing into position the unit 6 is thrust inward into the recess 2 in the valve housing with the rounded off first side wall 17 to the fore as indicated by the arrow 42. The comparatively large radius in the transitional portion between the first side wall 17 and the holding wall 14 provides for non-skew axial displacement even on moving past one of the openings 43 of the valve ducts 5.

The thrust force required for pressing int place may be applied quite satisfactorily as indicated by the arrows 44 at the annular outer side wall section 27 of the second side wall 18. This wall section, which extends essentially in a plane running at a right angle to the longitudinal axis 44 of the sealing unit 6, offers a highly satisfactory possibility for the engagement of a pressing-in tool, the engagement area or face being relatively far to the outside radially so that accidental bending of the second side wall 18 is out of the question. Owing to the step 28 the inner side wall section 29, which delimits the annular opening 25 on the one side, is axially offset in relation to the outer side wall section 27 so that accidental engagement by the pressing in tool is prevented and the width of the annular opening 25 is not changed by displacement in the course of fitting.

This latter feature is more especially important if, as in the case of the present embodiment, the sealing portion 26 extends through the annular opening 25 with a certain degree of axial play. This axial play renders it possible for small axial movements of the sealing part 26 to take place and contributes to reducing the slip-stick friction. After a long period without movement the sealing part 25 frequently inclines to stick on the part, surrounded by it, of the valve spool 3. Accordingly the valve spool 3 cannot be moved without difficulty or even at all when it is to be put into use. However owing to the axial play there is then a certain possibility of movement, the sealing portion 26 being moved as well along a short distance in order to finally to abut against one of the two end portions 23 and 24 so that the valve spool 3 may be freed.

For the manufacture of the sealing unit 6 it is preferred to utilize the method illustrated in FIGS. 3 through 6.

In this preferred form of the method firstly a thin loop 45 (FIG. 3) having a circular outline, is employed to produce a dish-like housing ring blank 46 (FIG. 4). The loop 45, which is preferably made of sheet metal, is best in the form of a disk-like stamped component.

The forming of the loop 45 to give the housing ring blank 46 is conveniently performed by a method step comparable with deep drawing, the loop 45 being thrust into a complementary mold 48 by means of a stamp 47. The resulting housing ring blank 46 possesses a bottom wall 52 and a cylindrical peripheral wall 53 extending upward from its peripheral edge.

After this the housing ring blank 46 so produced is placed in a further complementary mold 54 which possesses a mold portion 55 corresponding to the stepped second wall 18. By thrusting a preferably annular stamp 56 inward the bottom wall 52 is engaged with the mold part 55 and accordingly assumes the stepped configuration corresponding to the second side wall 18.

Before, during or after the forming method step for the second side wall 18 the bottom wall 52 is centrally perforated by means of a further stamp 57 so that an aperture 58 is produced and the second side wall 18 is cut to the desired radial size.

It will be clear that the aperture 58 may also be provided in the loop 45 as such so that the dish-like housing ring blank 46 has a centrally perforated bottom wall 52.

The housing ring blank 46 now produced and subjected to further displacement is placed in a further complementary mold 59 as indicated in the left hand half of FIG. 6. The depth of the workpiece receiving recess 60 in the mold 59 is less than is the case with other complementary molds so that the peripheral wall 53 will have its end portion 63 (which is not yet formed) opposite to the bottom wall 52 projecting therefrom. By the application of a further stamp 64 this end portion 64 will be converted into the shape indicated in the right hand half of FIG. 6, such form corresponding to the arcuately curved first side wall 17. However previous to this, while the end portion 63 is still not formed, the sealing element 13, produced separately, for example by injection molding, is introduced into the housing ring blank 46. Accordingly the end portion 63 is bent by the stamp 64 about a part of the sealing element 13 until the final form of the annular sealing unit 6, which may also be termed a sealing cartridge, is produced.

In the case of the further stamp 64 for forming the end part 63 it may for example be a question of a roller tool or an embossing tool.

It will be clear that even on cutting out the loop 45 the dimensions will be so selected that following forming of the end portion 63 no further working is required and more especially the radial distance between the end portions 23 and 24 and the holding wall 14 is equal everywhere and has the desired size.

The method as described above renders possible low-cost manufacture of the sealing unit without machining and with a high degree of accuracy.

We claim:

1. An annular sealing unit for use on an axially movable valve spool to produce a sealing action between the spool and the valve housing of a multiway valve, comprising a single-piece housing ring, which comprises a radially externally arranged cylindrical holding wall serving for a press-fit attachment to the housing and first and second spaced apart annular side walls extending from the housing wall and projecting radially inward, the walls of the housing ring delimiting between them an annular space which opens radially inward at a peripherally extending annular opening, in which space at least one annular, elastically yielding sealing element is anchored, said element having a sealing portion adapted for cooperating with the valve spool and extending radially inward through the annular opening, wherein the one first side wall of the housing ring has, as seen in section, an arcuate form with a curved portion axially bulging out away from the other, second side wall, the second side wall, as seen in section, has a stepped form and possesses a straight outer side wall section being directed essentially radially inward from and adjoining the holding wall, and furthermore an inner side wall section adjoining the first wall section via a step, said inner wall section being offset toward the first side wall and also extending radially inward, the portion, which lies between the outer side section of the second side wall and the arcuate portion, opposite to same, of the first arcuate side wall, of the annular space forming an anchoring portion for the sealing element, the width of this anchoring portion being larger than the width of the annular opening, which to the side is delimited by the inner side section of the second side wall and the terminal portion, opposite to same, of the arcuate first side wall.

2. The sealing unit as set forth in claim 1, wherein the holding wall, as considered in section, adjoins the arcuate first side wall as a tangential extension thereto.

3. The sealing unit as set forth in claim 1, wherein between the holding wall and the outer section of the second wall a rounded transitional portion is present, the holding wall and the outer side wall section, as considered in section, respectively adjoining the transitional portion.

4. The sealing unit as set forth in claim 1, wherein the radially outwardly directed outer face of the holding wall is a press fit face without a sealing element.

5. The sealing unit as set forth in claim 1, wherein the housing ring is a metallic component.

6. The sealing unit as set forth in claim 1, comprising a single sealing element held in the annular space of the housing ring, said sealing element possessing an anchoring part arranged in the anchoring portion of the annular space, the width of the anchoring part being larger than the width of the annular opening.

7. The sealing unit as set forth in claim 1, wherein said outer section of the second side wall constitutes an engagement part for a pressing tool on pressing of the sealing unit into a recess in a valve housing.

8. The sealing unit as set forth in claim 1, wherein the housing ring is a formed part brought into its final form by forming without machining.

* * * * *